(12) United States Patent
Kanczuzewski et al.

(10) Patent No.: US 11,479,162 B2
(45) Date of Patent: Oct. 25, 2022

(54) DEVICE AND METHOD FOR RESTRAINING CARGO

(71) Applicant: LOGISTICK, INC., South Bend, IN (US)

(72) Inventors: Nicholas Kanczuzewski, South Bend, IN (US); John E. Townsend, Paw Paw, IN (US); Jason Ramtahal, Berrien Springs, MI (US)

(73) Assignee: LOGISTICK, INC., South Bend, IN (US)

( * ) Notice: Subject to any disclaimer, the term of this patent is extended or adjusted under 35 U.S.C. 154(b) by 370 days.

(21) Appl. No.: 16/926,375

(22) Filed: Jul. 10, 2020

(65) Prior Publication Data

US 2022/0009403 A1    Jan. 13, 2022

(51) Int. Cl.
  *B60P 7/15*    (2006.01)
  *B65D 90/00*    (2006.01)

(52) U.S. Cl.
  CPC ............ *B60P 7/15* (2013.01); *B65D 90/0053* (2013.01)

(58) Field of Classification Search
  CPC ........... B60P 7/15; B60P 7/135; B60P 7/0892; B65D 90/0053
  USPC ......................... 410/152, 143, 144, 150, 151
  See application file for complete search history.

(56) References Cited

U.S. PATENT DOCUMENTS

| | | | |
|---|---|---|---|
| 969,002 A | 8/1910 | Teachout | |
| 1,238,874 A | 9/1917 | Biela | |
| 1,401,419 A | 12/1921 | Mcnally | |
| 1,951,660 A | 3/1934 | Klaudt | |
| 2,124,082 A | 7/1938 | Reifer | |
| 2,414,160 A | 1/1947 | Moon | |
| 2,464,080 A | 3/1949 | Hankins | |
| 2,467,681 A | 4/1949 | McKinney | |
| 2,468,101 A | 4/1949 | Nampa | |
| 2,468,104 A | 4/1949 | Phillips | |
| 2,603,167 A * | 7/1952 | Webster | B61D 45/006 |
| | | | 410/152 |
| 2,697,631 A | 12/1954 | Miller | |
| 2,752,864 A | 7/1956 | McDougal, Sr. et al. | |
| 2,766,704 A | 10/1956 | McMahon | |
| 2,845,245 A | 5/1958 | Gray et al. | |
| 2,905,107 A | 9/1959 | Nichol | |
| 2,912,939 A | 11/1959 | Miner, Jr. et al. | |
| 2,980,037 A | 4/1961 | Elsner | |
| 2,993,708 A | 7/1961 | Holman, Jr. | |
| 3,075,478 A | 1/1963 | Elsner | |
| 3,090,600 A | 5/1963 | Smith | |
| 3,177,007 A | 4/1965 | Oren | |
| 3,344,750 A | 10/1967 | Kostrewa | |
| 3,367,286 A | 2/1968 | Jantzen | |
| 3,559,591 A | 2/1971 | Breen et al. | |
| 3,590,746 A | 7/1971 | Gibson | |
| 3,712,663 A | 1/1973 | Laven | |
| D232,821 S | 9/1974 | Fry | |
| 3,836,174 A | 9/1974 | Holman, Jr. | |

(Continued)

FOREIGN PATENT DOCUMENTS

GB    1209255    10/1970

*Primary Examiner* — Stephen T Gordon
(74) *Attorney, Agent, or Firm* — Barnes & Thornburg LLP

(57) ABSTRACT

A device for engaging an elongated support for restraining cargo in a container having a pair of opposed walls and configured to transfer to shear stress at least some of the tensile force applied by the elongated support.

10 Claims, 3 Drawing Sheets

(56) References Cited

U.S. PATENT DOCUMENTS

| | | |
|---|---|---|
| 3,995,565 A | 12/1976 | Kersey |
| 4,026,508 A | 5/1977 | Ziegler |
| 4,080,906 A | 3/1978 | Brown |
| D248,228 S | 6/1978 | Robertson |
| 4,264,251 A | 4/1981 | Blatt |
| 4,278,376 A | 7/1981 | Hunter |
| 4,396,325 A | 8/1983 | Joice-Cavanagh |
| 4,432,678 A | 2/1984 | Liebel |
| 4,473,225 A | 9/1984 | Miller |
| 4,498,824 A | 2/1985 | Kinkle |
| 4,616,757 A | 10/1986 | Hobson |
| 4,700,918 A | 10/1987 | Andrasko, Jr. |
| 4,718,584 A | 1/1988 | Schoeny |
| D294,340 S | 2/1988 | Robson |
| 4,735,468 A | 4/1988 | Taylor, Jr. et al. |
| 4,756,498 A | 7/1988 | Frye |
| 4,801,228 A | 1/1989 | Van Gompel |
| 4,830,558 A | 5/1989 | Sweeney |
| 4,846,610 A | 7/1989 | Schoenleben |
| 4,880,342 A | 11/1989 | Pradovic |
| 4,932,817 A | 6/1990 | Mattare |
| 4,955,771 A | 9/1990 | Bott |
| 4,962,907 A | 10/1990 | Gary |
| D312,604 S | 12/1990 | Barnes et al. |
| 4,982,922 A | 1/1991 | Krause |
| 5,028,184 A | 7/1991 | Krause |
| 5,037,256 A | 8/1991 | Schroeder |
| D324,303 S | 3/1992 | Miller |
| 5,156,110 A | 10/1992 | Fuller |
| 5,161,700 A | 11/1992 | Stannis et al. |
| 5,169,007 A | 12/1992 | McHendry |
| D332,242 S | 1/1993 | Graehling |
| 5,219,251 A | 6/1993 | Kanczuzewski |
| D339,682 S | 9/1993 | Phleps |
| 5,259,712 A | 11/1993 | Wayne |
| 5,281,063 A | 1/1994 | Austin, III |
| D344,482 S | 2/1994 | Arvidsson |
| D347,419 S | 5/1994 | Jackson |
| 5,320,464 A | 6/1994 | Long et al. |
| 5,326,204 A | 7/1994 | Carlson et al. |
| 5,362,184 A | 11/1994 | Hull et al. |
| 5,370,482 A | 12/1994 | Long |
| 5,392,972 A | 2/1995 | Caruso et al. |
| D358,125 S | 5/1995 | Jackson |
| 5,494,389 A | 2/1996 | Kanczuzewski |
| 5,526,972 A | 6/1996 | Frazier et al. |
| D372,016 S | 7/1996 | Wolford |
| D373,754 S | 9/1996 | Pinterpe |
| D376,578 S | 12/1996 | Redford |
| 5,636,951 A | 6/1997 | Long et al. |
| D382,533 S | 8/1997 | Okland |
| 5,688,087 A | 11/1997 | Stapleton et al. |
| D392,246 S | 3/1998 | Anderson |
| D395,998 S | 7/1998 | Ballinger |
| D397,322 S | 8/1998 | Tobin |
| 5,807,047 A | 9/1998 | Cox |
| D406,095 S | 2/1999 | Denny et al. |
| D412,151 S | 7/1999 | Ferrigan |
| D422,554 S | 4/2000 | Stapleton et al. |
| 6,068,228 A | 5/2000 | Kobayashi et al. |
| D426,512 S | 6/2000 | Ciuba |
| 6,074,143 A | 6/2000 | Langston et al. |
| 6,086,299 A | 7/2000 | Kanczuzewski |
| 6,106,205 A | 8/2000 | Haire |
| D434,369 S | 11/2000 | Matthies |
| D438,022 S | 2/2001 | Bunn |
| D450,291 S | 11/2001 | Wang |
| D453,869 S | 2/2002 | Schultz et al. |
| D458,210 S | 6/2002 | Kanczuzewski et al. |
| 6,419,434 B1 | 7/2002 | Rahn |
| 6,431,804 B1 | 8/2002 | Wetzig, III |
| D462,310 S | 9/2002 | Kanczuzewski et al. |
| 6,454,501 B1 | 9/2002 | Parker |
| 6,533,513 B2 | 3/2003 | Kanczuzewski et al. |
| 6,572,063 B1 | 6/2003 | Gitelman et al. |
| D478,857 S | 8/2003 | Petersen et al. |
| 6,607,338 B2 | 8/2003 | Lemke |
| 6,851,652 B1 | 2/2005 | Huang |
| 6,874,982 B2 | 4/2005 | Rhodes |
| D506,076 S | 6/2005 | Weisgerber |
| 6,942,004 B2 | 9/2005 | Whittemore |
| 7,037,055 B1 | 5/2006 | Rogers et al. |
| 7,134,820 B2 | 11/2006 | Ehrlich |
| D537,405 S | 2/2007 | Saward |
| 7,334,973 B2 | 2/2008 | Scott |
| 7,356,888 B2 | 4/2008 | Chao et al. |
| D571,279 S | 6/2008 | Trusty et al. |
| 7,503,738 B1 * | 3/2009 | Doyle ................... B60P 7/15 |
| | | 410/121 |
| D589,709 S | 4/2009 | Edwards |
| 7,628,572 B2 | 12/2009 | Kanczuzewski et al. |
| 7,713,008 B2 | 5/2010 | Kanczuzewski et al. |
| 7,785,051 B2 | 8/2010 | Kanczuzewski et al. |
| 7,785,052 B2 | 8/2010 | Kanczuzewski et al. |
| 7,817,922 B2 | 10/2010 | Cho et al. |
| D633,030 S | 2/2011 | Robertson |
| D638,345 S | 5/2011 | Kanczuzewski et al. |
| 8,172,494 B1 | 5/2012 | Knox |
| 8,192,121 B1 | 6/2012 | Kanczuzewski et al. |
| 8,425,166 B2 | 4/2013 | Kanczuzewski et al. |
| 8,545,150 B2 | 10/2013 | Kanczuzewski et al. |
| 8,545,151 B2 | 10/2013 | Kanczuzewski et al. |
| 8,550,758 B2 | 10/2013 | Kanczuzewski et al. |
| 8,696,273 B1 | 4/2014 | Kanczuzewski et al. |
| D722,004 S | 2/2015 | Kanczuzewski et al. |
| 9,234,537 B2 | 1/2016 | Huang |
| D756,291 S | 5/2016 | Masanek, Jr. |
| 9,550,446 B1 | 1/2017 | Kanczuzewski et al. |
| 9,764,679 B2 | 9/2017 | Kanczuzewski et al. |
| 9,821,701 B2 | 11/2017 | Kanczuzewski et al. |
| 2002/0071733 A1 | 6/2002 | Parker |
| 2002/0176759 A1 | 11/2002 | Kanczuzewski |
| 2003/0223839 A1 * | 12/2003 | Trine ................... B60P 7/15 |
| | | 410/151 |
| 2004/0156692 A1 | 8/2004 | Rhodes |
| 2007/0224010 A1 | 9/2007 | Cunningham |
| 2008/0152455 A1 | 6/2008 | Kanczuzewski |
| 2010/0111636 A1 | 5/2010 | Widynowski |
| 2010/0308091 A1 | 12/2010 | Hubbard |
| 2011/0068137 A1 | 3/2011 | Murray et al. |
| 2011/0142564 A1 * | 6/2011 | Kaburick ............... B60P 7/15 |
| | | 410/150 |
| 2015/0158411 A1 | 6/2015 | Pakulak |
| 2019/0366907 A1 | 12/2019 | Kanczuzewski |
| 2019/0367266 A1 | 12/2019 | Kanczuzewski |
| 2019/0367267 A1 | 12/2019 | Kanczuzewski |

* cited by examiner

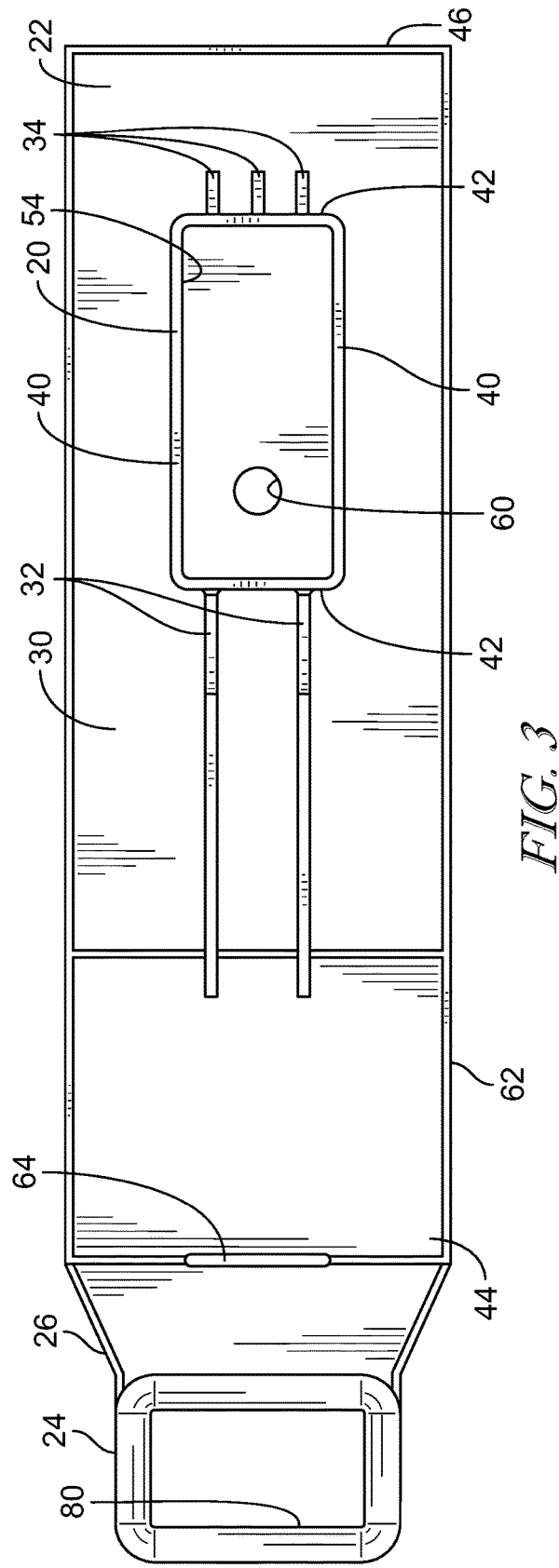

DEVICE AND METHOD FOR RESTRAINING CARGO

The present disclosure relates generally to a device for restraining cargo within a container.

BACKGROUND

There are many commercially-available cargo restraining devices that are used to restrain cargo in a truck or other shipping container with the use of a 2×4 or other support that extends across the bed of the shipping container. The ends of the support are secured to the opposing walls inside the shipping container by cargo restraining devices. Examples of such devices are disclosed for example in U.S. Pat. Nos. 6,533,513, 7,628,572, 7,713,008, 7,785,051, 8,192,121, 8,425,166, 8,550,758, 8,545,151, 8,545,150, 9,550,446, 9,764,679, 9,821,701, 10,611,292, 10,611,558 and 10,647,504. The present disclosure is an improvement to such cargo restraining devices.

SUMMARY

The present disclosure relates to a cargo restraining device for engaging a 2×4 or other elongated support. The cargo restraining device comprises a base strip having a top surface and a bottom surface defining a hole extending through the top surface and the bottom surface. The base strip has a front end and a back end and the hole is disposed nearer the back end than the front end. The bottom surface is substantially flat and extends uninterrupted flat along substantially its entire length except for the hole. The area of the hole is no more than 0.5% of the area of the bottom surface. The cargo restraining device further includes a sleeve comprising a front wall, a rear wall and a pair of lateral walls disposed about the hole. The front, rear and lateral walls are nearer the back end of the base strip than the front end. The lateral walls have a length longer than each of the front wall and rear wall. The front, rear and lateral walls and the top surface define a rectangular cavity for receiving an end of the support. The cavity is contiguous with the hole. The rectangular cavity extends from the top surface the entire height of the sleeve.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

BRIEF DESCRIPTION OF THE DRAWINGS

FIG. 3 is a top plan view of the cargo restraining device of FIG. 2; and

FIG. 4 is bottom plan view of the cargo restraining device of FIG. 2, with the adhesive layer removed.

DETAILED DESCRIPTION

Figure 1:
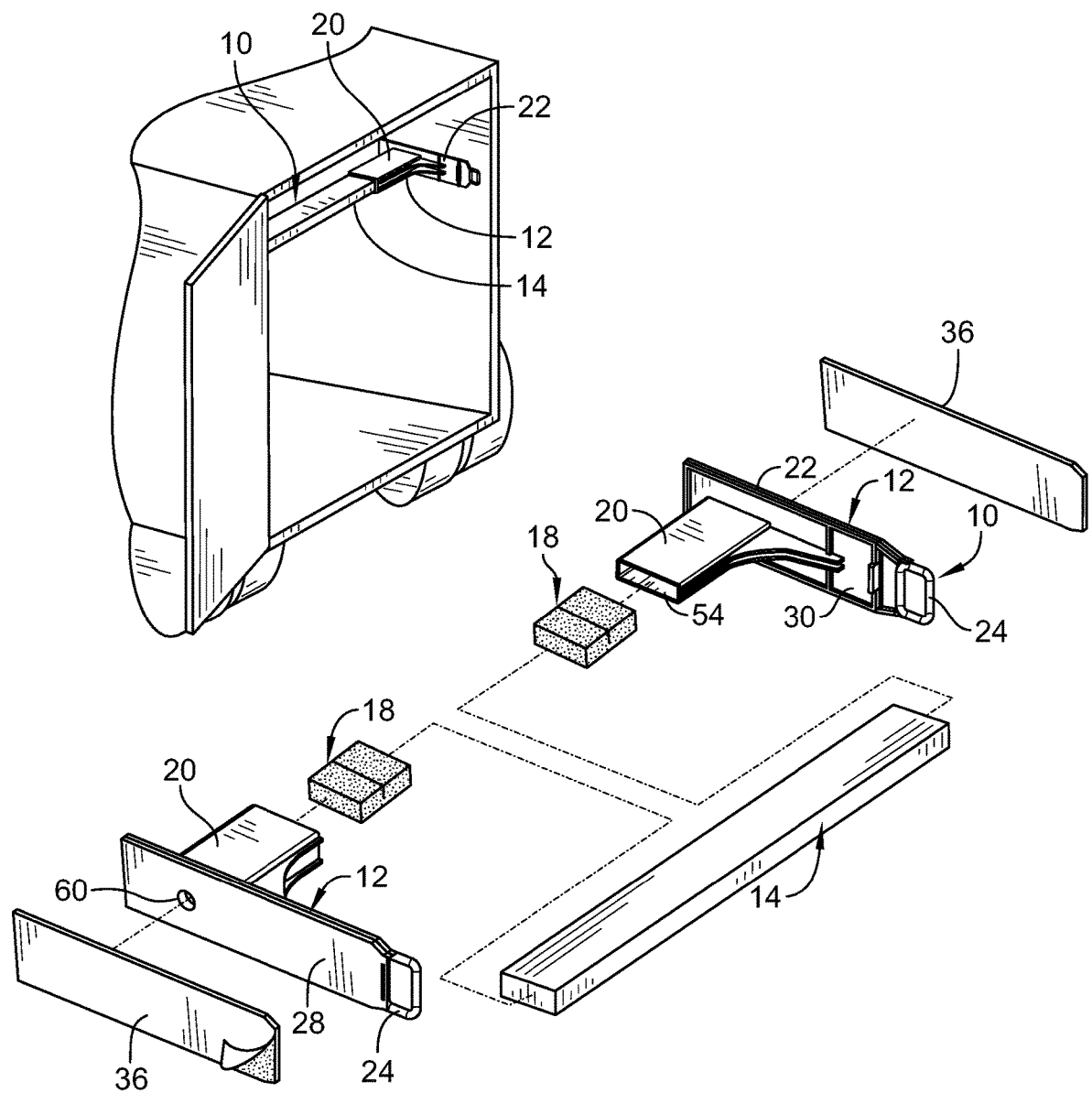
FIG. 1 is a partial view of a semi-trailer and a cargo restraint assembly in accordance with an illustrated embodiment of the present disclosure being used to restrain cargo in the semi-trailer, including an exploded view of the cargo restraint assembly.
Figure 2:
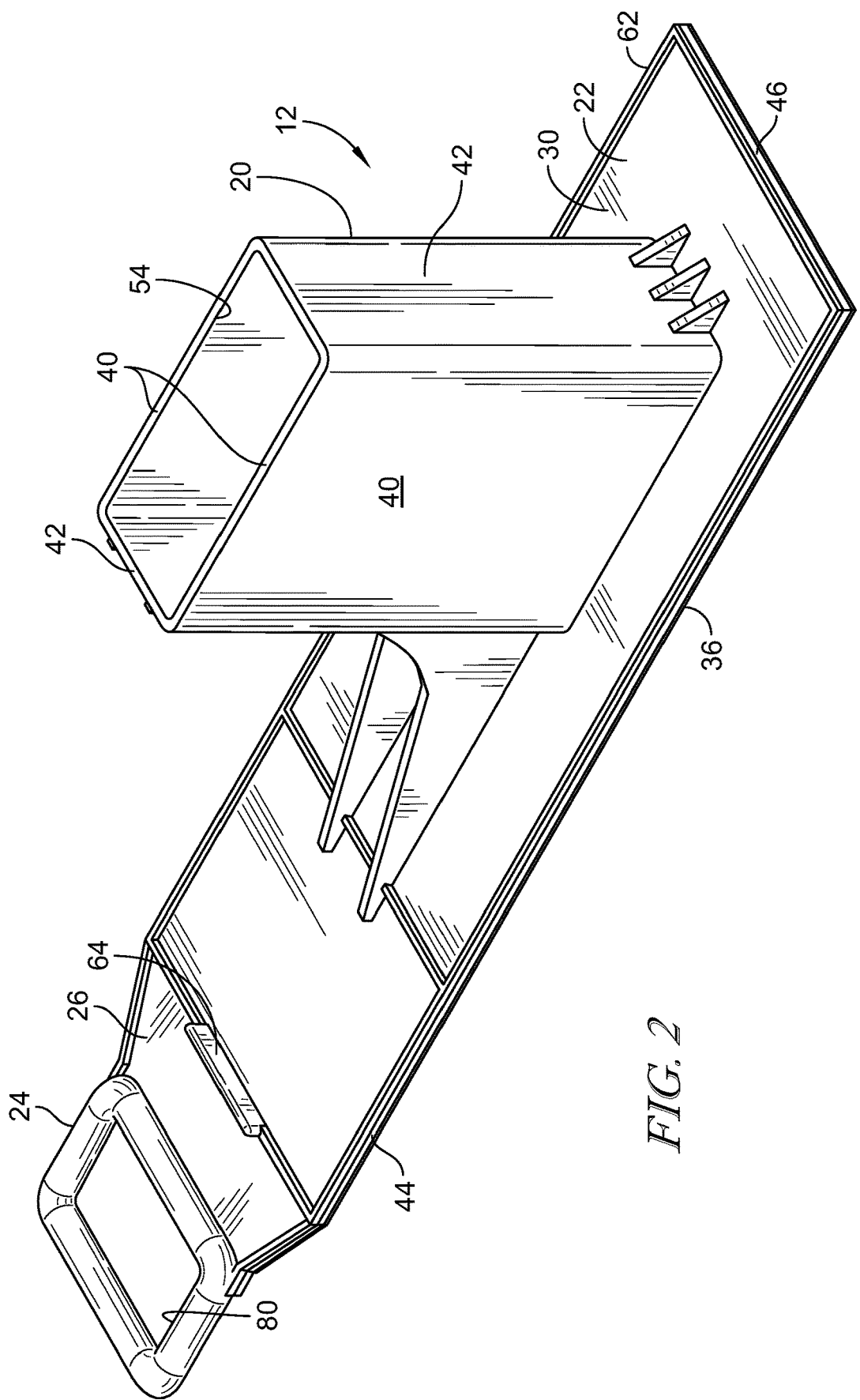
FIG. 2 is a top perspective view of one of the cargo restraining devices of FIG. 1.

FIG. 1 illustrates a cargo restraint assembly 10 restraining cargo in a container in the form of a semi-trailer. The cargo restraint assembly 10 includes a pair of cargo restraining devices 12 in accordance with an illustrated embodiment of the present disclosure, an elongated support 14 in the form of a 2×4, and a compressible foam insert 18. The pair of cargo restraining devices 12 is secured to opposed walls of the semi-trailer and is engaged with the elongated support 14, with the elongated support extending across the bed of the semi-trailer. The cargo restraint assembly 10 in accordance with the present disclosure is used for limiting the shifting of cargo being transported by or within the semi-trailer, or by or within any other shipping vehicle or other container, such as, for example, any type of truck, railcar, ship or aircraft or other shipping vehicle.

Each cargo restraining device 12 may have any suitable construction. In the embodiment illustrated in FIGS. 1-4, each cargo restraining device 12 in accordance with the illustrated embodiment of the present disclosure comprises generally a sleeve 20, an elongated rectangular base strip 22, a handle 24 and a connecting portion 26 connecting the strip 22 and the handle 24. The strip 22 has a rectangular bottom strip surface 28 and a rectangular top strip surface 30. The cargo restraining device 12 includes a plurality of gussets 32 and 34 extending from the sleeve 20 to the base strip 22 for adding strength and rigidity to the sleeve 20 and transferring to shear stress at least some of the tensile force applied by the elongated support 14. Each cargo restraining device 12 may be constructed of any suitable material such as any suitable plastic or other material.

Each cargo restraining device 12 may also include an adhesive 36 disposed on the bottom surface 28 for securing the bottom surface 28 to the wall of the semi-trailer. The adhesive 36 may be in any suitable form. The adhesive 36 may, for example, be in the form of a layer of an acrylic based or rubber based adhesive. The adhesive may include a removable release liner. After removal of the release liner, the cargo restraining device 12 can be pressed against one of the walls of the semi-trailer to secure it to the wall. The adhesive 36 instead may be in the form of a two-sided tape with a removable release liner, or may be in any other suitable form.

The sleeve 20 extends from the top surface 30 perpendicular to the strip 22. The sleeve 20 comprises a pair of opposed side or lateral walls 40 and a pair of opposed end walls 42. The walls 40 and 42 extend from the top surface 30 generally perpendicular to the strip 22 and the walls 40 and 42 and the top surface 30 defines a cavity 54 sized and configured to receive the compressible foam insert 18 at the end of the elongated support 14. The walls 40 and 42 have substantially the same height and thus the height of the sleeve 20 is the height of the walls. The lengths of the opposed end walls 42 are substantially the same and are less than the length of the lateral walls 40 so that the cavity 54 has a rectangular cross section. The strip 22 has a front end 44 and a back end 46. The sleeve 20 is disposed nearer the back end 46 than the front end 44.

The cavity 54 extends from the top surface 30 the entire height of the sleeve 20 and has a rectangular cross section along the entire height of the sleeve 20. With this construction, the sleeve 20 can receive substantially more foam than prior art cargo restraining devices which provides additional compression on the elongated support 14 in the form of a 2×4 and increases the load capacity of the elongated support.

The top surface 30 defines a small hole 60 disposed between the walls 40 and 42 that is contiguous with the cavity 54. The hole 60 is disposed nearer the back end 46 than the front end 44 of the strip 22. The length of the elongated support 14 may also affect how much of the foam insert 18 is removed. The hole 54 may have a diameter of about ¼ square inch. The hole 60 may be used to remove the foam insert 18 before or after adhesive is removed to the extent users are interested in such removal. The hole 60 may, for example, be a through hole for purposes of forming the cargo restraining device 12 during injection molding.

The bottom surface 28 is flat and substantially uninterrupted flat along the entire length and width of the strip 22 except for the hole 60. The area of the bottom surface 28 is approximately 52 square inches. Thus, the area of the hole 60 is less than 0.4% of the area of the bottom surface, which provides substantially more surface for securing to the adhesive. Although the adhesive may extend across a larger opening and still function, the strip 22 is much stronger because of the small size of the hole 60. The relative areas of the hole 60 and bottom surface 28 can be any suitable size provided that the area of the hole 60 is no more than about 0.5% of the surface area of the bottom surface 28.

The top surface 30 of the strip 22 includes a rail 62 extending substantially about its perimeter also to add strength and rigidity to the strip 22 and transfer at least some of the tensile force applied by the elongated support 14 to shear stress. The illustrated strip 22 also includes a lip 64 on its top surface 30 for providing stackability of two cargo restraining devices 12.

The compressible foam insert 18 and an end of the elongated support 14 are received by the cavity 54. The compressible foam insert 18 is scored about its perimeter to form a separable portion of the compressible foam insert 18 that can be readily removed to reduce the height of the insert 18. Thus, the intact compressible foam insert 18 can be used in semi-trailers or other containers with a certain internal width and the shortened compressible foam insert can be used in semi-trailers or other containers having a slightly smaller internal width. The insert 18 may include any other suitable structure for forming a removable portion in accordance with other embodiments of the present disclosure and may be formed of any other suitable non-foam material.

The handle 24 is disposed adjacent the front end 44 of the strip 22 and is configured to facilitate manual installation and removal of the cargo restraining device 12 from the wall of the semi-trailer after use. The handle 24 has a rectangular construction. The handle 24 extends generally parallel to the strip 22 and an opening 80 to facilitate manual grasping of the cargo restraining device 12 when it is secured to a wall for installation and removal from the wall. The handle 24 also has a height that extends higher than the top surface of the strip for providing stackability of two cargo restraining devices 12.

The cargo restraining device 12 in accordance with the illustrated embodiment of the present disclosure provides many benefits. With its design, the sleeve 20 of the cargo restraining device 12 is able to receive more foam than prior art devices to better able the transfer of tensile force imposed by the elongated support to shear stress and to withstand the shear stress. Additionally, the bottom surface 28 has substantially more adhering surface immediately beneath the sleeve 20 than the prior art devices.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A cargo restraining device for engaging a support, the cargo restraining device comprising:
   a base strip having a top surface and a bottom surface defining a hole extending through the top surface and the bottom surface, the base strip having a front end and a back end and the hole being disposed nearer the back end than the front end, the bottom surface being substantially flat and being uninterrupted flat along substantially its entire length except for the hole, the bottom surface having an area of at least about 52 square inches and the hole having an area of no more than about ¼ square inch; and
   a sleeve comprising a front wall, a rear wall and a pair of lateral walls disposed about the hole, the front, rear and lateral walls are nearer the back end of the base strip than the front end, the lateral walls having a length longer than each of the front wall and rear wall, the front, rear and lateral walls and the top surface defining a rectangular cavity for receiving an end of the support, the cavity being contiguous with the hole.

2. The cargo restraining device of claim 1 wherein the front wall, the rear wall and the lateral walls each extend from the top surface and have a same height, the rectangular cavity extending the entire height of each of the front wall, rear wall and lateral walls.

3. The cargo restraining device of claim 1 wherein the sleeve has a height and the rectangular cavity extends from the top surface of the base strip the entire height of the sleeve.

4. The cargo restraining device of claim 1 wherein the bottom surface is rectangular.

5. The cargo restraining device of claim 1 wherein the top and bottom surfaces are rectangular.

6. A cargo restraining device for engaging a support, the cargo restraining device comprising:
   a base strip having a top surface and a bottom surface defining a hole extending through the top surface and the bottom surface, the base strip having a front end and a back end and the hole being disposed nearer the back end than the front end, the bottom surface being substantially flat and being uninterrupted flat along substantially its entire length except for the hole, the bottom surface having an area and the hole having an area, the area of the hole being no more than 0.5% of the area of the bottom surface; and
   a sleeve comprising a front wall, a rear wall and a pair of lateral walls disposed about the hole, the front, rear and lateral walls are nearer the back end of the base strip than the front end of the base strip, the lateral walls having a length longer than each of the front wall and rear wall, the front, rear and lateral walls and the top surface defining a rectangular cavity for receiving an end of the support, the cavity being contiguous with the hole, the sleeve being disposed nearer the back end of the base strip than the front end of the base strip.

7. The cargo restraining device of claim 6 wherein the front wall, the rear wall and the lateral walls each extend from the top surface and each has a same height, the rectangular cavity extending the entire height of each of the front wall, rear wall and lateral walls.

8. The cargo restraining device of claim 6 wherein the sleeve has a height and the rectangular cavity extends from the top surface of the base strip the entire height of the sleeve.

9. The cargo restraining device of claim 6 wherein the bottom surface is rectangular.

10. The cargo restraining device of claim 6 wherein the top and bottom surfaces are rectangular.

* * * * *